(12) United States Patent
Surjaatmadja et al.

(10) Patent No.: US 6,336,502 B1
(45) Date of Patent: Jan. 8, 2002

(54) SLOW ROTATING TOOL WITH GEAR REDUCER

(75) Inventors: Jim B. Surjaatmadja, Duncan; James C. Tucker, Springer, both of OK (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 09/370,692

(22) Filed: Aug. 9, 1999

(51) Int. Cl.$^7$ ............................................. F01C 1/10
(52) U.S. Cl. ........................ 166/104; 175/107; 475/162
(58) Field of Search .............................. 166/104, 222, 166/223; 175/107; 475/162

(56) References Cited

U.S. PATENT DOCUMENTS

| | | | | |
|---|---|---|---|---|
| 398,214 | A | * | 2/1889 | Autenrieth .................. 475/162 |
| 4,080,115 | A | * | 3/1978 | Sims et al. .................. 475/162 |
| 4,090,574 | A | * | 5/1978 | Garrison ...................... 475/162 |
| 4,170,441 | A | * | 10/1979 | Trzeciak ...................... 475/162 |
| 4,699,023 | A | | 10/1987 | Bajulaz ......................... 74/804 |
| 4,807,494 | A | | 2/1989 | Lew ............................... 74/768 |
| 4,841,811 | A | | 6/1989 | Bajulaz ......................... 74/804 |
| 5,484,016 | A | | 1/1996 | Surjaatmadja et al. ...... 166/104 |
| 5,533,571 | A | | 7/1996 | Surjaatmadja et al. ...... 166/222 |

FOREIGN PATENT DOCUMENTS

| DE | 42 31 025 A 1 | 3/1994 |
|---|---|---|
| EP | 0 277 861 A 1 | 8/1988 |

OTHER PUBLICATIONS

*Gear Handbook, The Design, Manufacture and Application of Gears*, Darle W. Dudley, Editor, 1962, pp. 3–34 through 3–39.

Four pages of a brochure containing Reduto® product information (Jan., 1995).

* cited by examiner

*Primary Examiner*—William Neuder
(74) *Attorney, Agent, or Firm*—Robert Kent; Anthony L. Rahhal

(57) ABSTRACT

A slow rotating apparatus for use in performing downhole operations. The apparatus generally consists of a motor section with a rotor rotatable in response to fluid flow, a speed reducer section connected to the motor section such that an output speed of the speed reducer section is less than an output speed of the rotor, and a jetting section or other head attached to the speed reducer section and rotated thereby at the speed reducer output speed. A flow passage is defined through the speed reducer section so that fluid may communicate therefrom into the jetting head. The speed reducer section includes an input shaft attached to the rotor. The input shaft has an eccentric portion and has an input gear disposed about the eccentric portion. The input gear is a solid gear having a first outer geared surface and a second outer geared surface. The pitch diameter of the first outer geared surface is less than the pitch diameter of the second outer geared surface. A speed reducer body has a geared inner surface defined thereon in geared engagement with the first outer geared surface. A follower gear is disposed in the body and is in geared engagement with the second outer geared surface. Rotation of the input shaft causes the eccentric portion thereof to rotate in the input gear causing eccentric rotation of the input gear. Eccentric rotation of the input gear is translated into pure rotation by the follower gear which rotates the output shaft.

28 Claims, 5 Drawing Sheets

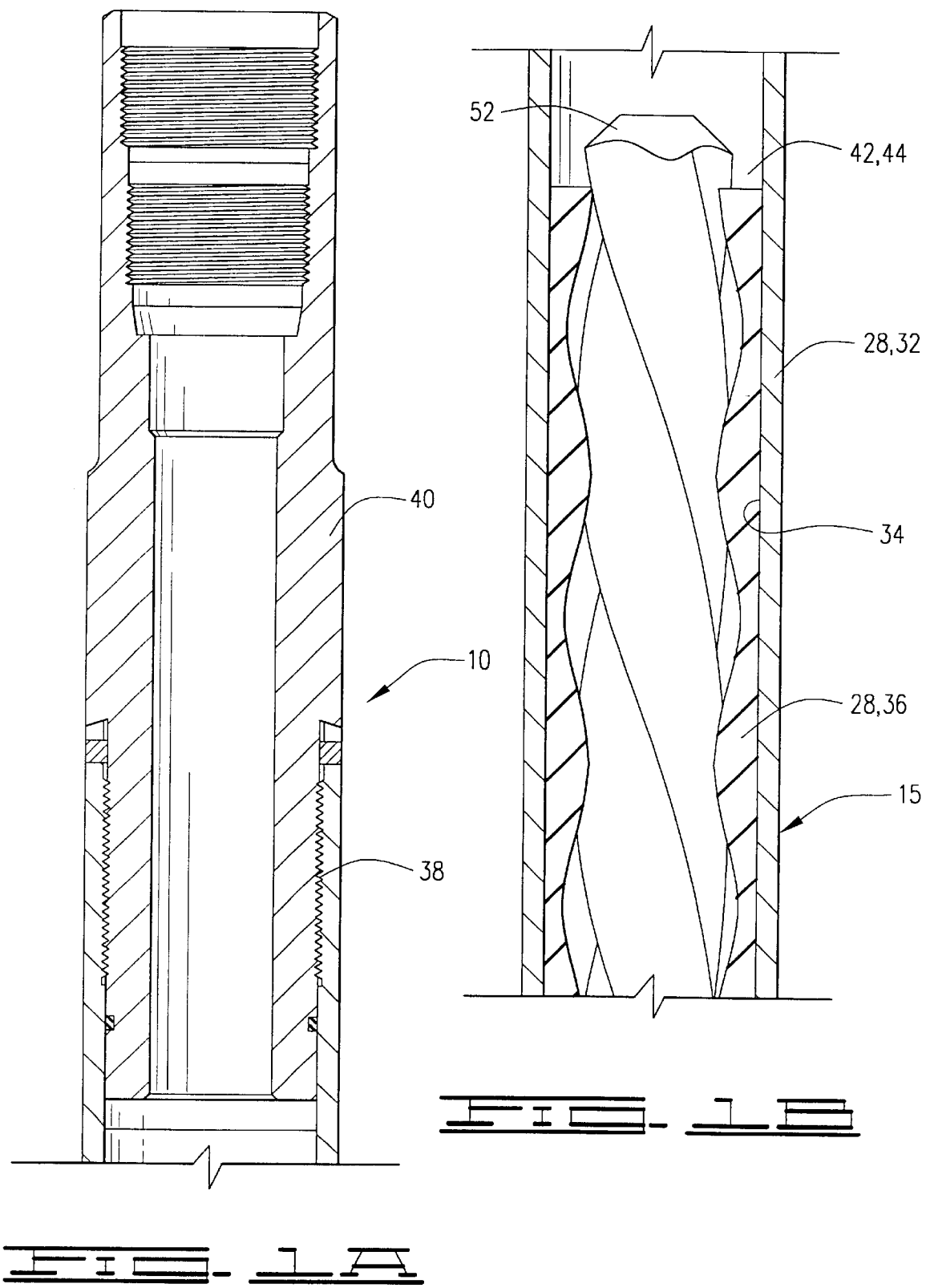

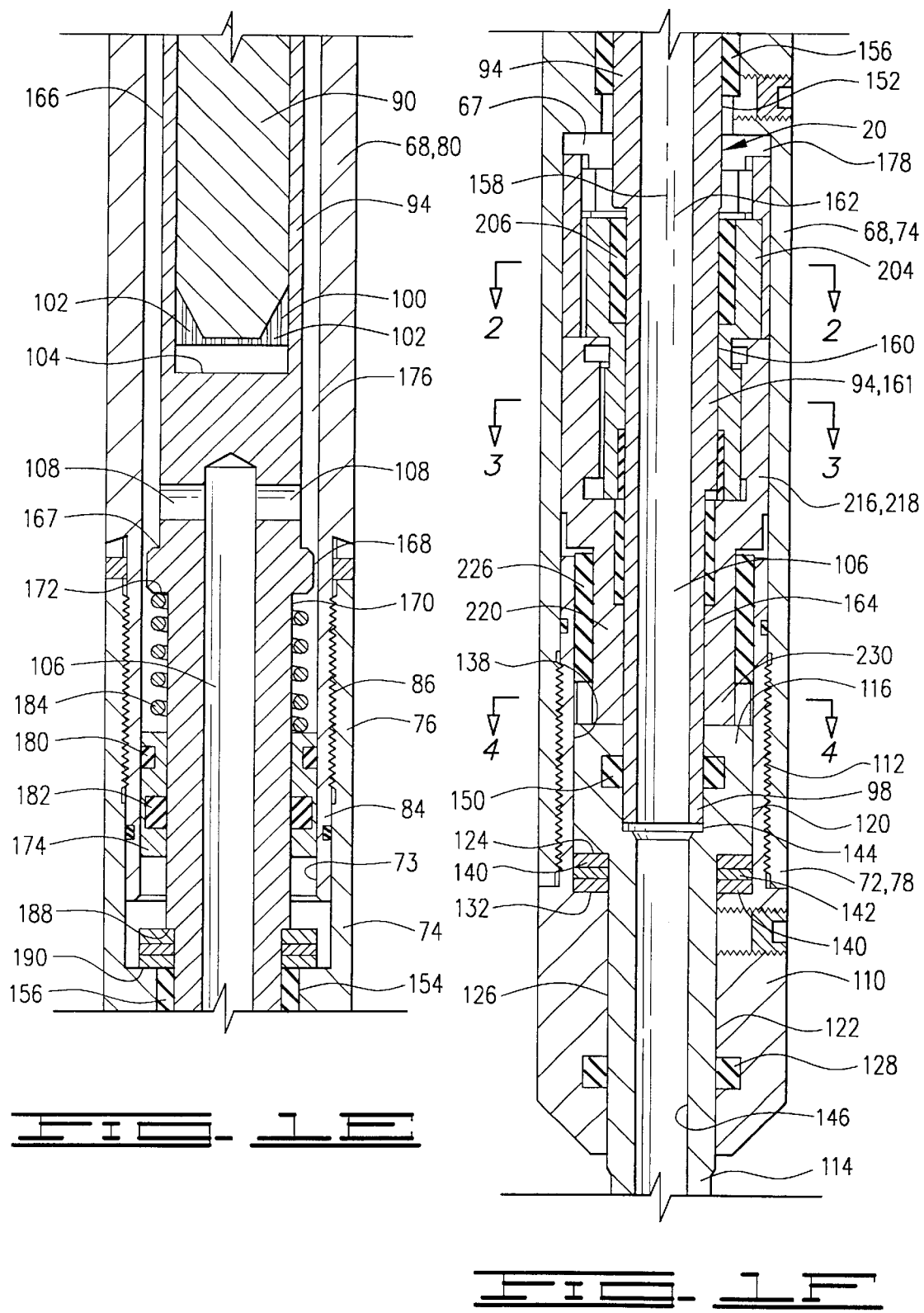

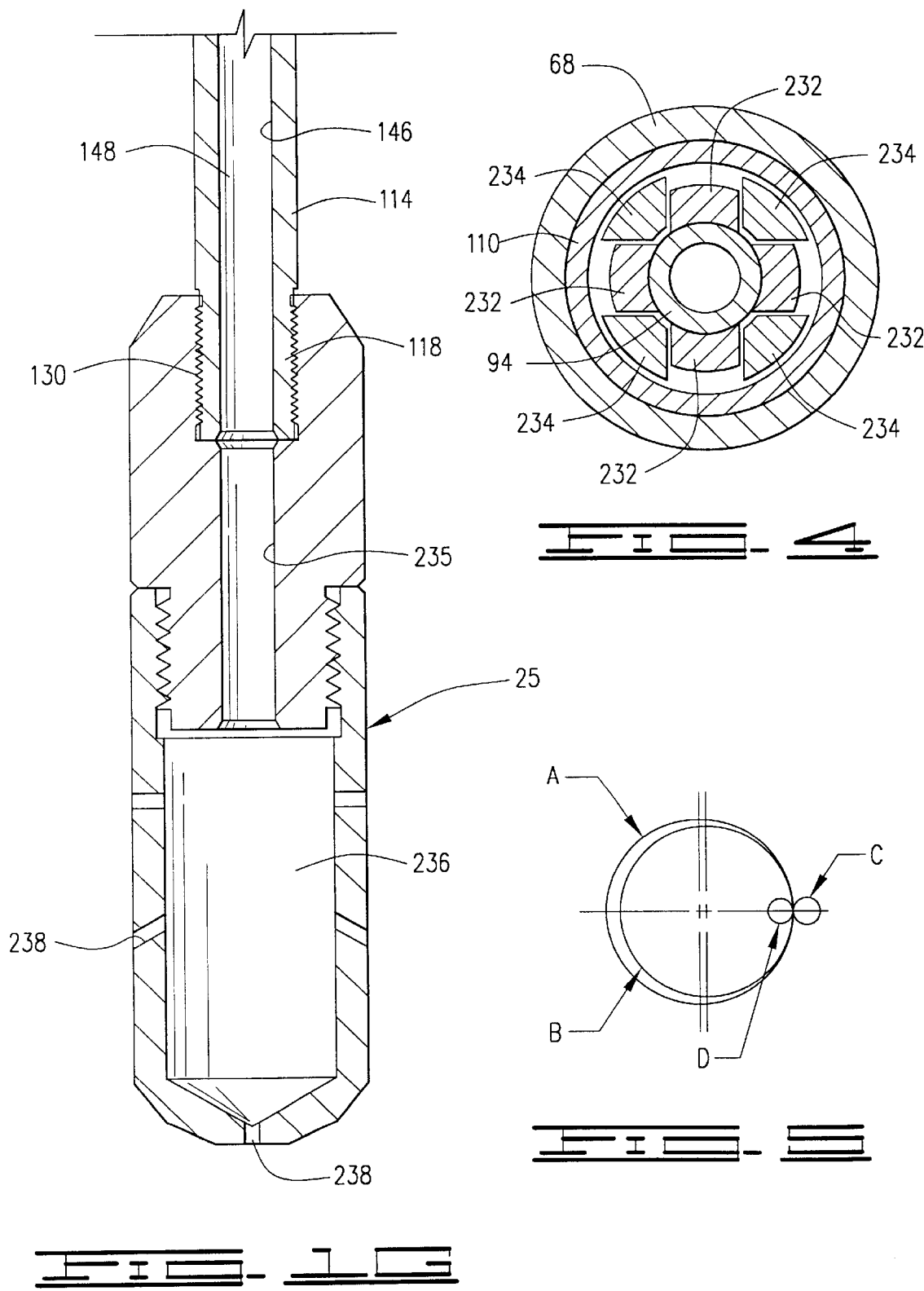

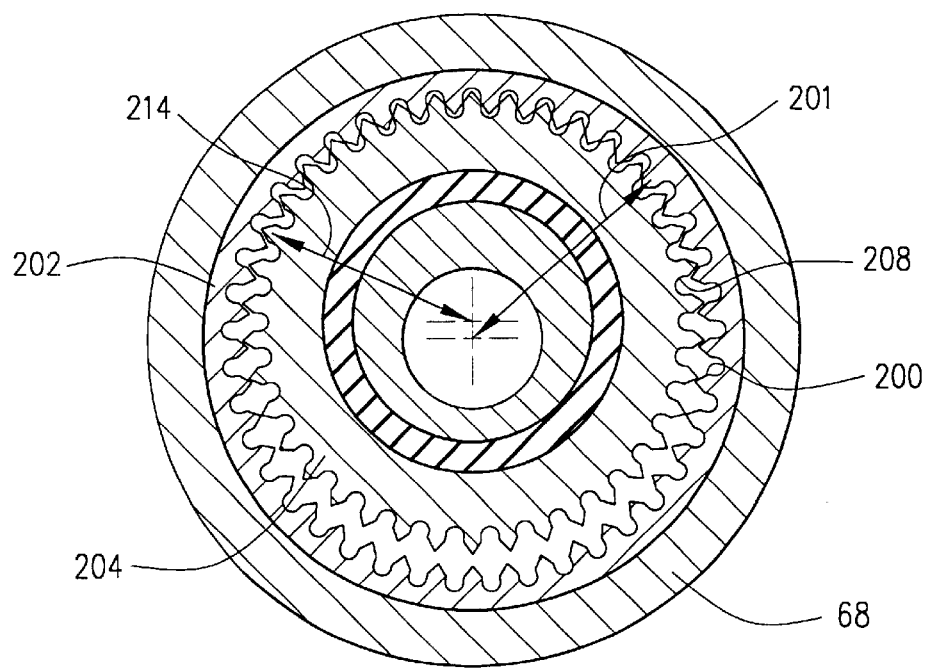
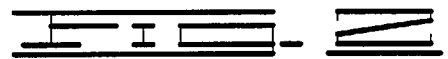
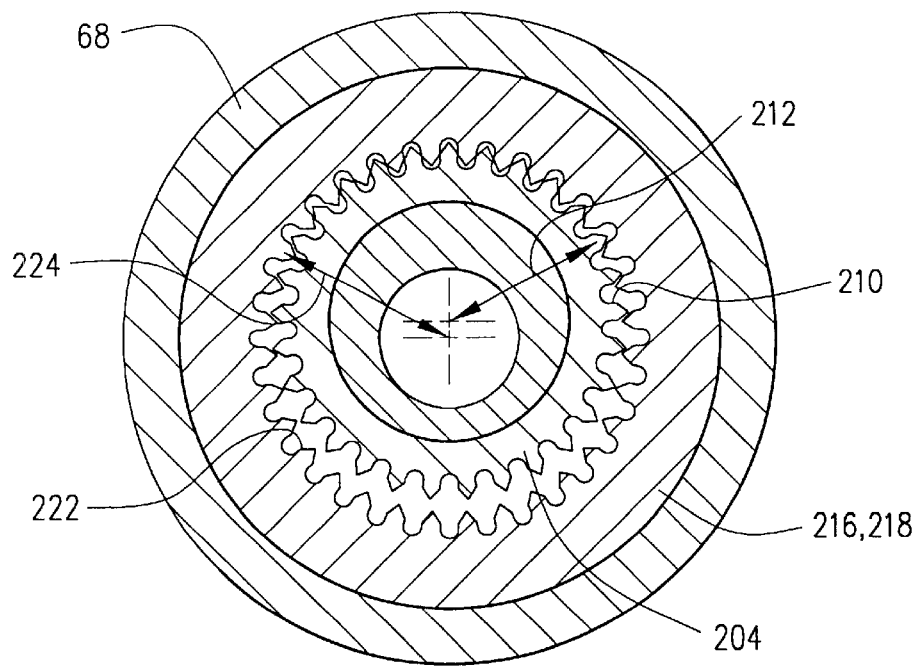
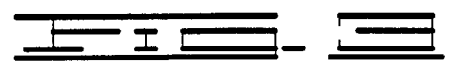

SLOW ROTATING TOOL WITH GEAR REDUCER

BACKGROUND OF THE INVENTION

This invention relates to rotating apparatus for performing downhole operations in a wellbore, and more particularly to a slow rotating apparatus having a gear reducer.

There are a number of instances where a downhole apparatus having the capability of slow rotation at the end thereof is useful for performing a variety of different downhole operations. One primary use for such an apparatus is to remove the buildup of material on the inside of the pipelines, well casing or tubing. Unless removed, such buildup can plug tubing in both production and injection wells. Pipelines have similar problems. As set forth in U.S. Pat. No. 5,484,016 (the '016 patent) issued Jan. 16, 1996 to Surjaatmadja et al. and U. S. Pat. No. 5,533,571 (the '571 patent) issued Jul. 9, 1996 to Surjaatmadja et al., the details of both of which are incorporated herein by reference, there are a number of common compounds which cause buildup problems. Those compounds include barium sulfate, silicates, calcium carbonate, calcium sulfate, carbonate, sulfate, silica, water scale with hydrocarbons, coke tar, coke and complexes, wax and complexes, paraffin, sludges, muds and gels.

There are a number of different methods that have been used to remove material buildup. For example, paraffin buildup may be dealt with by utilizing hot oil to melt the paraffin. Hot water has also been used to melt or remove paraffin and chemicals are also utilized to dissolve paraffin deposits. Other methods to remove buildup include Dyna-Drills run on coil tubing, milling with jointed tubing, acid washing, and broaching with a wireline.

As noted in the '016 patent, all of the above methods have certain deficiencies. To avoid the problems faced when applying such methods, jet cleaning was developed to utilize high-pressure liquids to remove the materials by erosion. Generally, jet cleaning has been limited to removing mud cake, paraffin or packed sand. Jet cleaning tools of the type used to perform such operations are usually made of heavy wall mechanical tubing with a plurality of holes of various diameters drilled in a symmetrical pattern around the tool. Water is used as the cleaning media. Job results were usually unpredictable. All of these techniques have achieved limited success, and it has been necessary on many occasions to change out the production tubing string. Accordingly, there is a need to efficiently and thoroughly clean material buildup in well casing or tubing.

The Otis "HYDRA-BLAST"® system was developed to address these problems by providing an economical means of cleaning buildup deposits from downhole tubing. This system utilizes high-pressure fluid jet technology in conjunction with the economy and efficiency of coiled tubing. The HYDRA-BLAST® system includes an indexing jet cleaning tool, an in-line high-pressure filter, a surface filter unit, a circulation pump with tanks and a coiled tubing unit. It also utilizes a computer program to design the actual cleaning jobs for any particular situation. The optimum jet size and number, retrieval speed and number of passes is calculated to accomplish a successful job, and this is particularly important in trying to remove harder materials such as the harder barium compounds. In general, this system may be described as a water-blasting system which directs high-pressure streams of water against the buildup to remove the material by the roding or cutting action of moving fluid.

In a typical application of the "HYDRA-BLAST"® system, the operator uses a cleaning tool which usually utilizes a downward stream to cut into the material as the tool is lowered into the tubing. This portion of the tool is not particularly well adapted for removing large amounts of buildup along the walls after the tool is free to pass therein. So, the original down-blast tool is removed from the well, and an additional trip is made with a side-blast jetting head designed specifically for the purpose of providing jets directed against the buildup on the walls of the tubing. Reciprocation of the tool is usually necessary for thorough cleaning. This two-step process works well for short or moderate length buildup areas, but it is not particularly well adapted for extremely long buildup areas because it is difficult to rotate and reciprocate the tool to cover such an area. Also, without the ability to rotate, a large number of nozzles will be needed to provide good coverage which will increase flow and pressure drop due to fluid friction. This reduces the efficiency of the jets.

The inventions set forth in the '571 and '016 patents address many of the deficiencies of prior art methods of removing buildup by providing a slow rotating mole apparatus for use in wellbores and pipelines but still has certain limitations. The invention described in the '571 patent provides a method and apparatus for cleaning that generally does not require an additional trip into the wellbore. However, the '571 patent is not directed to rotating apparatus. The invention described in the '016 patent includes a speed reducer to provide a slow rotating jetting head. The speed reducer utilizes wobble gears so that the gears are tilted slightly with respect to the longitudinal axis of the entire apparatus. The wobble gear rotates and wobbles, thus causing a rotation and wobbling of jetting section. Because of the wobble gear, the apparatus described in the '016 patent would not be usefull in applications where pure rotation is required.

For example, such an arrangement could not be effectively used where it was desired to utilize a fishing tool to thread into debris stuck in a wellbore to remove the debris therefrom. Likewise, the arrangement shown in the '016 patent would not be useful if it were desired to cut tubing in a wellbore as opposed to simply removing debris therefrom. In addition, because of the wobbling motion of the follower gear described in the '016 patent, the follower gear does not seal effectively with the body that houses the geared surfaces. Therefore, fluid from the wellbore, along with small grains of sand and other debris sometimes passes into the body and contaminates the body. Sand or other debris that enters the body can damage the gears and cause premature failure of the apparatus. The need therefore exists for a downhole apparatus which provides slow rotation with no wobble, which can be used, for example, to cut tubing or pipe in a wellbore, to blast and clean an area of buildup with only one trip into the wellbore, and to thread into the debris to remove debris from the wellbore. The need also exists for a slow rotating downhole tool that provides an effective seal as the tool is rotated.

The rotating apparatus of the present invention meets the above needs by providing a tool which translates high-speed motor rotation into slow output rotation. A seal is provided to prevent wellbore fluid from contaminating the interior of the apparatus and the apparatus can be rotated as it is lowered into the tubing to provide a complete 360° path of jetted fluid as it is moved longitudinally in the tubing. If desired, the tool can be utilized as a cutting tool simply by holding the tool at one location and providing orizontal jetting ports in a jetting section.

SUMMARY OF THE INVENTION

The present invention comprises a slow rotating apparatus for use in downhole operations such as removing debris from wellbores and pipelines, cutting tubing or other pipe in wellbores and performing fishing operations.

The slow rotating apparatus has a motor section which provides rotation. A speed reducer section is connected to the motor section such that an output speed of the speed reducer section is less than an output speed of the motor. A jetting section may be attached to the speed reducer section. The jetting section has at least one jetting port through which said fluid is jetted in communication with a flow passage in the speed reducer.

The motor may comprise a progressive cavity motor having a rotor rotatably disposed in an elastomeric stator. A coupling may be used to connect the rotor and input shaft of the speed reducer section. The speed reducer section preferably comprises a rotatable input shaft which has an eccentric portion, and an input gear rotatably disposed about the input shaft on the eccentric portion thereof The input gear is a solid gear having first and second outer geared surfaces defined thereon. The second outer geared surface preferably has a smaller pitch diameter than the first outer geared surface. The second outer geared surface may have a larger pitch diameter than the first outer geared surface, but such an arrangement will reverse the direction of the output relative to the input.

The speed reducer section also comprises an inner geared surface defined on a speed reducer body which houses the input shaft. The first outer geared surface of the input gear is disposed in and is in geared engagement with the inner geared surface defined by the speed reducer body. A follower gear is disposed in the body about the input gear and is in geared engagement with the second outer geared surface of the input gear. The follower gear is rotatably disposed in the speed reducer body and is concentric with and thus shares the longitudinal central axis of the input shaft. Because the input gear is disposed about the eccentric portion of the input shaft, the gear will rotate eccentrically in the speed reducer body as the input shaft rotates about its longitudinal central axis. Clockwise rotation of the input shaft will cause the input gear to rotate eccentrically counterclockwise about the longitudinal central axis of the input shaft in the geared inner surface of the speed reducer body.

The eccentric rotation of the second outer geared surface in the follower gear will cause the follower gear to rotate in the speed reducer body at a rotational speed less than the rotational speed of the rotor. An output shaft is connected to and is rotatable by the follower gear. A jetting head or other desired head may be attached to the output shaft to perform downhole operations such as cleaning debris, cutting and other desired operations.

Numerous objects and advantages of the invention will become apparent as the following detailed description of the preferred embodiments is read in conjunction with the drawings which illustrate the embodiments.

BRIEF DESCRIPTION OF THE DRAWINGS

FIGS. 1A–1G show a longitudinal cross section of a preferred embodiment of the slow rotating apparatus of the present invention.

FIG. 2 is a cross section taken along lines 2—2 in FIG. 1F.

FIG. 3 is a cross section taken along lines 3—3 in FIG. 1F.

FIG. 4 shows a cross section taken along lines 4—4 in FIG. 1F.

FIG. 5 schematically depicts pitch diameters and other features of the geared surfaces of the present invention.

DESCRIPTION OF THE PREFERRED EMBODIMENT

Figures 9, 10:
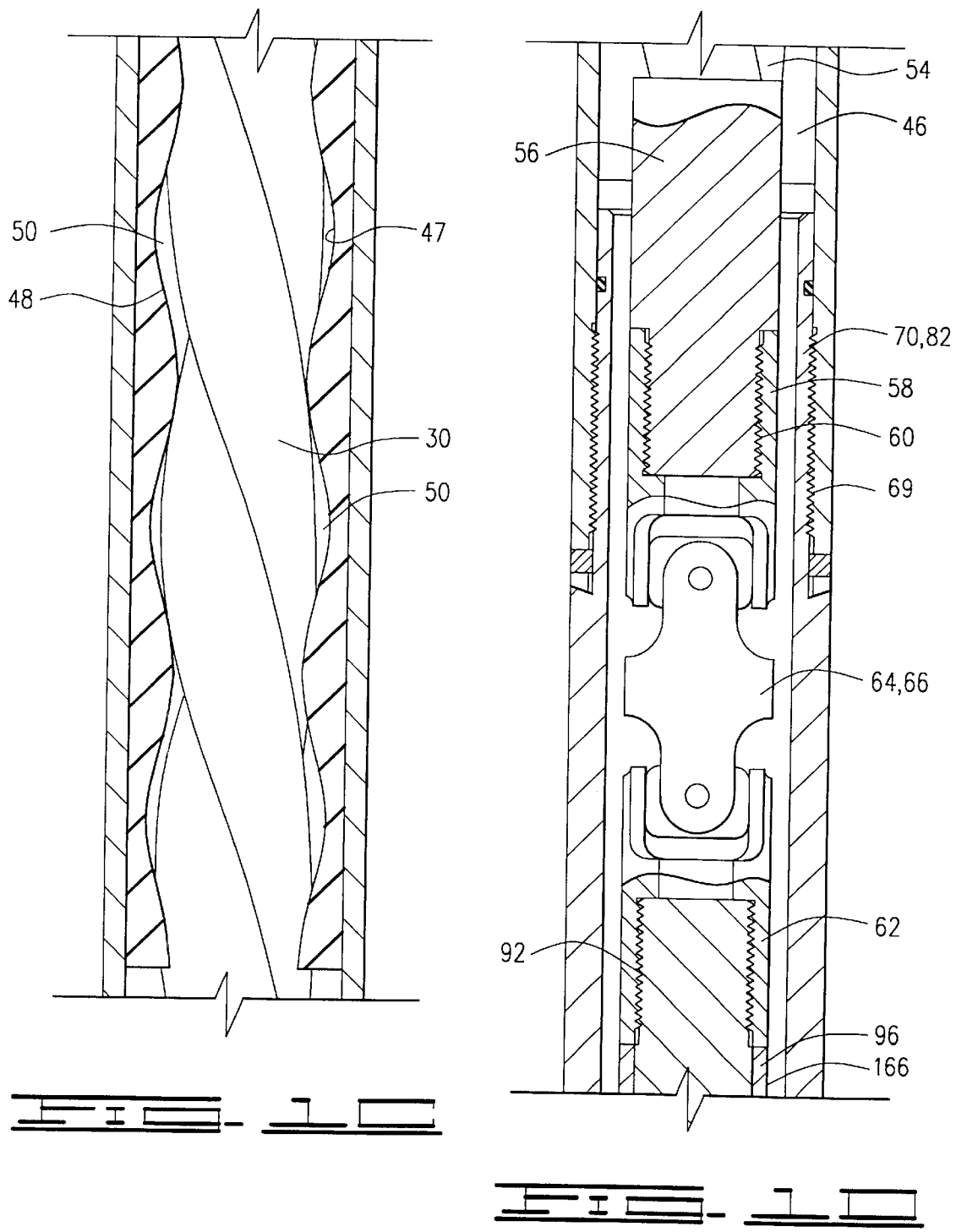

Referring now to the drawings, and more particularly to FIGS. 1A–1G, a preferred embodiment of the slow rotating apparatus for performing downhole operations is shown and generally designated by the numeral 10. Apparatus 10 generally comprises a motor section 15, a speed reducer section 20, and a jetting section 25. Motor section 15 is used to provide torque for operating the jetting section 25. Speed reducer section 20 reduces the rotational speed between motor section 15 and jetting section 25. Although the apparatus 10 is shown herein with a jetting section attached to a lower end thereof for cleaning debris built up in tubing or other pipe, it will be understood that other downhole tools may be attached to a lower end thereof such as a jetting head which has horizontal ports for cutting tubing, a fishing head utilized to thread into and remove debris stuck in a wellbore, or other tools which require or are useful with slow rotation in a wellbore.

Motor section 15 is of a kind known in the art commonly referred to as a mud pump or motor, and it generally comprises a progressive cavity motor with a stator assembly 28 having a rotatable element 30 such as a rotor 30, rotatably disposed therein. Rotor 30 is shown in elevation section as opposed to the cross-section view in the remainder of drawings 1A–1F. Stator assembly 28 includes a stator case, or motor housing 32 defining a longitudinal bore 34 therethrough. A stator 36, preferably made of an elastomeric material, is disposed in bore 34 and is preferably sealingly disposed therein. Motor housing 32 preferably has threads 38 defined at an upper end thereof which may be connected to a top sub 40 which is adapted for connection to a coil tubing unit or other pipe or tool string.

Stator 36 and rotor 30 define a longitudinally extending motor chamber 42, which may also be referred to as a driving chamber 42. Motor chamber 42 is in communication at its upper end with an inlet chamber 44 in motor housing 32 and a generally annular outlet chamber 46 at the lower end of the motor housing. The inner surface of stator 36 defining motor chamber 42 is corrugated such that a helical screw-like thread 47 is defined there along. The outer surface of rotor 30 defines a rounded substantially helical screw-type threaded surface 48 thereon. The interaction of threaded rotor surface 48 with stator surface 46 and motor chamber 42 forms a plurality of cavities 50 spaced along the length of the pumping chamber.

Rotor 30 has upper end 52 and a lower end 54. Lower end 54 of rotor 30 defines a rotor adapter 56 which is connected to an upper coupling adapter 58 at threaded connection 60. Upper coupling adapter 58 is connected to lower coupling adapter 62 by swivel assembly 64. Upper coupling adapter 58, lower coupling adapter 62 and swivel assembly 64 form a U-joint coupling assembly 66 of a type known in the art.

The lower end of motor housing 32 is connected to a speed reducer body 68 of speed reducer 20 at threaded connection 69. Speed reducer body 68 defines a longitudinal opening 67 and has an upper end 70, a lower end 72, and an inner surface 73. Speed reducer body 68 may comprise a main body 74 having an upper end 76 and a lower end 78 and a tubular body extension 80 having an upper end 82 and a lower end 84. Tubular body extension 80 is connected to main body 74 at a threaded connection 86.

Lower coupling adapter 62 is attached to a splined male shaft 90 at threaded connection 92. An input shaft 94 of speed reducer section 20 is received about splined male shaft 90. Input shaft 94 has an upper end 96 and a lower end 98. Upper end 96 of shaft 94 comprises a splined opening 100 having splines 102 therein to mate with splined male shaft 90. Input shaft 94 is thus rotatably connected to splined male shaft 90 such that when splined male shaft 90 is rotated by rotor 30 through coupling 64, input shaft 94 will likewise rotate.

Splined opening 100 has a solid bottom 104. Input shaft 94 defines a longitudinal flow passage 106 extending from below solid bottom 104 to lower end 98 of shaft 96. Radial ports 108 extend through a side of shaft 94 and intersect longitudinal flow passage 106.

A bottom cap 110 is connected to body 68 at lower end 72 thereof at threaded connection 112. An output shaft 114 of speed reducer 20 is disposed in body 68 at the lower end thereof and extends from body 68 through bottom cap 110. Output shaft 114 has an upper end 116 and a lower end 118. Output shaft 114 has a first outer diameter of 120 on the upper end 116 thereof which is disposed in the lower end of speed reducer body 68 and is closely received in bottom cap 110. Second outer diameter 122 has a magnitude less than that of first outer diameter 120 and extends through a first inner, or sealing diameter 126 of bottom cap 110. A downward facing shoulder 124 is defined by and extends between diameters 120 and 122. Seals 128 are received in sealing diameter 26 and sealingly engaged second outer diameter 122 of output shaft 114. Thus, body 18 is sealed such that wellbore fluid cannot enter and contaminate body 68. Output shaft 114 is connected at its lower end 118 thereof to jetting head 25 at a threaded connection 130.

Bottom cap 110 defines an upward facing shoulder 132 between sealing diameter 126 and a second inner diameter 138 thereof A pair of thrust washers 140 and a thrust bearing 142 are disposed between shoulders 124 and 132 to allow for the rotation of output shaft 114. Output shaft 114 has a first or upper inner diameter 144 and a second or lower inner diameter 146 defining a longitudinal flow passage 148 through output shaft 114. Lower end 98 of input shaft 94 is sealingly received in first inner diameter 144 and is sealingly engaged by seals 150. Thus, longitudinal flow passage 106 of input shaft 94 is communicated with longitudinal flow passage 148 of output shaft 114 so that speed reducer section 20 has a longitudinal flow passage therethrough to communicate fluid into jetting head 25.

Input shaft 94 disposed in speed reducer body 68 has a plurality of outer diameters. As depicted in FIG. 1F, an outer diameter 152 will be referred to as a first outer diameter 152. First outer diameter 152 is rotatably disposed in speed reducer body 68 in a reduced diameter portion 154 thereof Preferably, first outer diameter 152 is rotatably disposed in a bearing 156 in reduced diameter portion 154. First outer diameter 152 has a longitudinal central axis 158.

Shaft 94 defines a second outer diameter 160 below first outer diameter 152. Second outer diameter 160 has magnitude smaller than that of first outer diameter 152, and has a longitudinal central axis 162. Longitudinal central axis 162 is parallel to and is offset from longitudinal central axis 158 of first outer diameter 152. Thus, as input shaft 94 is rotated about longitudinal central axis 152, which may be referred to as an axis of rotation, second outer diameter 160 will rotate eccentrically about longitudinal central axis 158. The portion of input shaft 94 having second outer diameter 160 may therefore be referred to as an eccentric portion 161 of input shaft 94. A third outer diameter 164 is defined by input shaft 94 below second outer diameter 160. Third outer diameter 164 is smaller in magnitude than second outer diameter 160 and is concentric with first outer diameter 152 and thus has the same longitudinal central axis, axis 158 as first outer diameter 152. Third outer diameter of input shaft 94 is sealingly received in output shaft 114.

Referring now back to FIG. 1D, input shaft 94 has a fourth or outermost diameter 166 defined at the upper end thereof Splined opening 100 is defined in the portion of input shaft 94 having outer diameter 166. Radial ports 108 are likewise defined through outer diameter 166. Outer diameter 166 has a lower end 167. Output shaft 94 defines a generally circular ridge 168 extending radially outwardly from fourth outer diameter 166 at lower end 167 thereof Circular ridge 168 separates fourth outer diameter from a fifth outer diameter 170 defined by input shaft 94. Fifth outer diameter 170 is smaller in magnitude than fourth outer diameter 166. A downward facing shoulder 172 is defined between circular ridge 168 and fifth outer diameter 170.

A seal 174, which may be referred to as a floating seal or floating piston 174 is sealingly disposed about fifth outer diameter 170 and sealingly engages inner surface 73 of reducer body 68 to separate reducer body 68, and opening 67 defined by speed reducer body 68, into an upper portion 176 and a lower portion 178. Motor chamber 42 is communicated with upper portion 176 of speed reducer body 68. Fluid from motor chamber 42 is thus communicated into longitudinal flow passage 106 through upper portion 176 of speed reducer body 68 and radial ports 108 in input shaft 94. Lower portion 178 of speed reducer body 68 is filled with oil, or other lubricating fluid. Floating piston 174 has a seal 180 engaging inner surface 73 of speed reducer body 68 and a seal 182 engaging input shaft 94 at fifth outer diameter 170 thereof. Floating piston 174 thus separates upper and lower portions 176 and 178, and prevents fluid in upper and lower portions 176 and 178 from mixing.

A compression spring 184 is disposed about input shaft 94 between shoulder 172 and floating piston 174. As is apparent from the drawings, such a configuration provides an easy assembly in that the input shaft can simply be inserted through a lower end of the body and around splined male shaft 90. The assembly will be held in place by lower cap 110.

A downward facing shoulder 188 is defined by and extends between fifth outer diameter 170 and first outer diameter 152. An upward facing shoulder 190 is defined by reduced diameter portion 154 of body 68. A pair of thrust washers 140 and a thrust bearing 142 are disposed about first outer diameter 152 and input shaft 94 between shoulders 188 and 190 to provide for rotation of input shaft 94.

Referring now to FIGS. 2 and 3, speed reducer body 68 has an inner geared surface 200 having a pitch diameter 201 defined thereon. Geared inner surface 200 may be defined by speed reducer body such that it is integrally formed on the inner surface thereof Inner geared surface 200 may, as in the embodiment shown, also be formed on a stationary drive gear 202. Stationary drive gear 202 is fixedly disposed in reducer body 68 such that it will not rotate therein. An input gear 204 is rotatably disposed about input shaft 94 and, as shown in FIG. 1F, is rotatably disposed about second diameter or eccentric portion 160 of input shaft 94. Input gear 204 and shaft 94 may have a bearing 206 disposed therebetween.

Input gear 204 is a solid gear having a first outer geared surface 208 and a second outer geared surface 210. First outer geared surface 208 is in geared engagement with geared inner surface 200. Second outer geared surface 210 preferably has a pitch diameter 212 that is less than a pitch diameter 214 first outer geared surface 208. Pitch diameter 201 of inner geared surface 200 is greater than pitch diameter 214 of first outer geared surface 208. First outer geared surface 208 thus has fewer gear teeth than inner geared surface 200.

Since standard gear tooth height is about 2.35/P where P is the diametral pitch, first outer geared surface 208 must have n fewer teeth than inner geared surface 200, where n is a number greater than 2.35. Preferably, n is as small as possible, and is therefore preferably 3, and gear teeth shape are preferably formulated to minimize the pressure angle, preferably to 0, or as close to 0 as possible, and to maximize teeth engagement. Making n as small as possible insures the maximum possible number of teeth will be engaged at any one moment in time. Such an arrangement while minimizing the pressure angle will provide for high torque transmission.

Generation of a tooth profile can be explained with reference to FIG. 5. By way of example, circles A and B are representative of pitch diameters 201 and 214, respectively. Circles C and D are representative of base circles for the internal gear (i.e., inner geared surface 200 on body 68) and the external gear (i.e., outer geared surface 208 on input gear 204), respectively. As shown, base circles C and D are positioned tangent to one another to make the pressure angle equal to 0, and tangent to pitch diameters 201 and 214 and are sized using the following equation:

$$r_C = 0.9*(1+n/p)+n/p$$

$$r_D = 0.9*n/p$$

In the equations $r_C$ is the radius of the base circle C, $r_D$ is the radius of base circle D, n is the difference in the number of teeth on outer geared surface 208 and inner geared surface 200 and P is the diametral pitch. Assuming, for example, geared surface 200 has 41 teeth, a diametral pitch of 32 and a pitch diameter of 1.28125, and further assuming surface 208 has thirty-eight teeth, a diametral pitch of 32, and a pitch diameter of 1.1875, $r_C=0.09229$ and $r_D=0.08438$. Using the base circles, an involute is generated as is normally done to create the tooth profile. The remainder of the tooth dimensions (i.e., thickness, height, etc.) are determined using standard formulations.

A follower gear 216 having a geared portion 218 and a follower gear shaft portion 220 is rotatably disposed in reducer body 68 and is in geared engagement with second outer geared surface 210 of input gear 204. Geared portion 218 of follower gear 216 has an inner geared surface 222 having a pitch diameter 224. Pitch diameter 224 is greater than pitch diameter 214 of second outer geared surface 210. Second outer geared surface 210 thus has fewer gear teeth than inner geared surface 222. Because first and second outer geared surfaces 208 and 210 are rigidly connected, the difference in the number of teeth between surface 210 and 222 must be the same as the preselected difference in teeth between inner geared surface 200 and first outer geared surface 208. If geared surfaces 208 and 210 are not rigidly connected, and different eccentricities are used, the difference in teeth between geared surfaces 210 and 222 does not necessarily have to be the same as the difference in teeth between geared surfaces 200 and 208.

The tooth configuration should be formulated as previously discussed to minimize the pressure angle and to maximize tooth engagement. Thus, referring again back to FIG. 5, but now designating A and B as representative of pitch diameters 224 and 212, and circles C and D as the base circles for the teeth on geared surfaces 222 and 210, respectively, the tooth profile can be determined using the prior equations. Assuming that surface 222 has thirty-two teeth, and a pitch diameter of 1.000, surface 210 has twenty-nine teeth and a pitch diameter of 0.90625, $r_C=0.09229$ and $r_D=0.08438$. The involute for the tooth can be drawn in the typical manner, and the tooth profile determined therefrom.

Referring now back to FIG. 1F, shaft portion 220 of follower gear 216 is rotatably disposed in body 68, and in the embodiment shown is disposed in an upper end of cap 110. A bearing 226 is disposed between shaft portion 220 and cap 110 to allow for rotation of shaft portion 220. Shaft portion 220 is concentric with first diameter 152 of input shaft 94 and thus shares the same longitudinal central axis 158.

As shown in FIG. 4—4, a lower end 230 of follower gear 216 has a plurality of lugs 232 extending therefrom. Lugs 232 are adapted to mate with a plurality of lugs 234 which are connected to and which extend from the upper end of output shaft 114. Thus, the output shaft 114 is rotatably connected to and is rotatable by follower gear 216.

In the embodiment shown, jetting head 25 is attached to the lower end of output shaft 114. Jetting head 25 defines a central bore 236 therein, which is in communication with flow passage 148 of output shaft 114. A plurality of jetting ports 238 are defined by jetting head 25 and in communication with central bore 236. The number of jetting ports 238 and the position of jetting ports 238 may be varied as desired. Central bore 236 is communicated with flow passage 148 of output shaft 114 through a longitudinal opening 235 defined in jetting heads 25.

To use the rotating apparatus 10 of the present invention, the apparatus is lowered into a well bore on a tubing string, or other pipe string until it is adjacent a point where it is desired that jetting begin. Jetting can be performed to clean debris, and if desired, horizontal ports only can be utilized if it is desired to cut casing or other pipe in a well bore. A fluid such as, but not limited to, water, or a slurry containing sand or other material, is pumped under pressure through the tubing string into apparatus 10. The fluid is forced to flow through motor chamber 42 causing rotation of rotor 30 within stator 36. Rotation of rotor 30 results in rotation of u-joint assembly 66 which rotates input shaft 94 through male splined shaft 90. The rotation of input shaft 94 results in a reduced speed of rotation of follower gear 216 and therefore output shaft 114.

The reduction of the rotational speed may be described as follows. As input shaft 94 rotates about longitudinal central axis 158 of first outer diameter 152, eccentric portion 161 of input shaft 94 rotates eccentrically about axis 158. The eccentric rotation of eccentric portion 161 in input gear 204 causes input gear 204 to rotate eccentrically in inner geared surface 200. Second outer geared surface 210, which is in geared engagement with inner geared surface 222 of follower gear 216 will rotate eccentrically in geared inner surface 222. The direction of rotation of input shaft 94 in a clockwise direction will cause first and second geared outer surfaces 208 and 210 to rotate eccentrically counterclockwise. Likewise, rotation of input shaft 94 in a counterclockwise direction will cause input gear 204 to rotate clockwise.

Assuming clockwise rotation of input shaft 94, the counterclockwise rotation of input gear 204 in follower gear 216 will cause follower gear 216 to rotate since follower gear 216 is rotatably disposed in body 68. Rotation of follower gear 216 will cause rotation of output shaft 114 through the lugged connection between follower gear 216 and output shaft 114, and rotation of output shaft 114 will cause rotation of jetting section 25.

The direction of rotation can be as desired. The speed reduction may be determined with the following equation:

$$r = \frac{No + n}{n(1 - No/Ni)}$$

In the equation, r is the reduction, No is the number of teeth on the output side of input gear 204, which is geared surface 210, Ni is the number of teeth on the input side of the input gear, which is geared surface 208, and n is the difference in the number of teeth between the inner geared surface 200 on the body and outer geared surface 208. For exemplary purposes, it will once again be assumed that inner geared surface 200 on the body 68 has 41 teeth and a pitch diameter of 1.28125. Outer geared surface of input gear 204 is assumed to have 38 teeth and therefore a pitch diameter of 1.1875.

Inner geared surface 222 of follower gear 216 may thus have a pitch diameter of 1.00 and 32 teeth. The difference between the number of teeth on second outer geared surface 210 and the inner geared surface 222 of follower gear 216 must be the same as the difference between the number of teeth on inner geared surface 200 of body 68 and first outer geared surface 208 of input gear 204. Thus, second outer geared surface 210 must have 29 teeth and has a pitch diameter of 0.90625. Speed reduction from the input shaft to the output shaft is:

$$r = \frac{29 + 3}{3(1 - 29/38)} = 45.04:1$$

Thus, for a motor rotation of 1000 rpm, the output shaft would rotate at 22.2 rpm. If it is desired to have less reduction, the number of teeth on second geared outer surface 210 may be lowered to something less than 32 teeth to increase the difference between the number of teeth on first outer geared surface 208 and second outer geared surface 210. As is apparent from the equation, the reduction can be increased simply by decreasing the difference between the number of teeth on surfaces 208 and 210. If second outer geared surface 210 has more teeth than first outer geared surface 208, such that the pitch diameter of geared surface 210 is greater than the pitch diameter of geared surface 208, output shaft 114 will rotate opposite the direction of the rotation of input shaft 94 and may have high or low reductions as desired.

Fluid used to drive shaft 94 passes from the pump through radial ports 108 into longitudinal flow passages 106 and 148 in input and output shafts 94 and 114, respectively. The fluid then passes into jetting section 25 and through jetting ports 238 to clean debris, cut tubing or perform any other downhole operation. Thus, it is seen the apparatus of the present invention provides ultra high speed reduction, with the use of a gear reducer, and thus provides a downhole apparatus that can generally reduce an output speed relative to input speed, and can also provide output rotation in the same or opposite direction as the input rotation.

Although the invention described herein subscribe with reference to a progressive cavity pump and a jetting head, any type of motor may be utilized to create rotation and any desired type of head or tool may be attached to output shaft 114 and rotated thereon to perform desired downhole operations such as cleaning, cutting, fishing, or other desired operations.

It will be seen therefore, that the slow rotating apparatus of the present invention is well adapted to carry out the ends and advantages mentioned, as well as those inherent therein. While the presently preferred embodiment of the apparatus has been shown for the purposes of this disclosure, numerous changes in the arrangement and construction of parts may be made by those skilled in the art. All of such changes are encompassed within the scope and spirit of the appended claims.

What is claimed is:

1. A gear reducer apparatus for providing speed reduction comprising:
   a rotatable input shaft having an eccentric portion;
   an input gear rotatably disposed about said eccentric portion of said input shaft, said input gear having first and second gear portions defining first and second outer geared surfaces respectively;
   a body disposed about said input gear, said body having an inner geared surface in geared engagement with said first outer geared surface wherein said input gear rotates eccentrically in said inner geared surface as said input shaft rotates;
   a follower gear disposed about said input gear in geared engagement with said second outer geared surface of said input gear, wherein said input gear rotates eccentrically in said follower gear so that said follower gear rotates about its longitudinal central axis as said input shaft rotates; and
   an output shaft concentric with and rotatable by said follower gear.

2. The apparatus of claim 1 wherein a pitch diameter of said first outer geared surface on said input gear is greater than a pitch diameter of said second outer geared surface on said input gear.

3. The apparatus of claim 1, wherein a longitudinal central axis of said output shaft is colinear with the axis of rotation of said input shaft.

4. The apparatus of claim 1 wherein, as said input shaft rotates, said output shaft rotates at a slower rotational speed than said input shaft in the same direction of rotation as said input shaft.

5. The apparatus of claim 1 wherein, as said input shaft rotates, said output shaft rotates at a slower rotational speed than said input shaft in a direction opposite the rotational direction of said input shaft.

6. The apparatus of claim 1, wherein said second outer geared surface on said input gear has a greater number of gear teeth than first outer geared surface.

7. The apparatus of claim 1 wherein said second outer geared surface on said input gear has a fewer number of gear teeth than said first outer geared surface.

8. The apparatus of claim 1, further comprising a stationary drive gear fixedly disposed in said body, said inner geared surface being defined by said stationary drive gear.

9. A rotating apparatus for use in performing downhole operations in a wellbore, the apparatus comprising:
   a drive motor comprising a motor housing having a rotatable element disposed therein for providing rotation;
   a body connected to said motor housing;
   a speed reducer disposed in said body and connected to said rotatable motor element, wherein an output speed of said speed reducer is less than an output speed of said motor, said speed reducer comprising:
      an inner geared surface in said body;
      an input gear having first and second geared surfaces thereon, said first geared surface being engaged with said inner geared surface in said body, said inner geared surface having a pitch diameter greater than a pitch diameter of said first geared surface on said input gear;

an input shaft connected to said rotatable motor element, said input shaft having an eccentric portion engaging a bore defined in said input gear so that as said input shaft is rotated, said input gear rotates eccentrically in said inner geared surface; and a follower gear rotatably disposed in said body, said follower gear being in geared engagement with said second geared surface on said input gear, wherein said follower gear rotates about its longitudinal central axis at said output speed as said input shaft is rotated;

an output shaft rotatable by said follower gear at said output speed of said speed reducer section; and a downhole tool connected to said rotatable output shaft for performing downhole operations in said wellbore.

10. The apparatus of claim 9, wherein said downhole tool comprises a jetting head attached to said output shaft for jetting a fluid therethrough.

11. The apparatus of claim 10, wherein said fluid flows through said motor housing and said rotatable element rotates in response to said flow of said fluid, said speed reducer defining a longitudinal flow passage therethrough communicated with said motor housing;

said output shaft having a longitudinal flow passage communicated with said longitudinal flow passage in said speed reducer, so that said fluid is communicated to said jetting body from said motor through said speed reducer and said output shaft, said jetting body defining a jetting port through which said fluid is jetted.

12. The apparatus of claim 11, said body having an upper portion and a lower portion, wherein said fluid from said motor is communicated from said motor into said upper portion of said body, said speed reducer having a radial port therethrough communicating said longitudinal flow passage in said speed reducer with said upper portion of said body, and wherein said lower portion is filled with a lubricating fluid.

13. The apparatus of claim 12, wherein said upper and lower portions have a seal therebetween to prevent said lubricating fluid and said fluid in said motor from mixing.

14. The apparatus of claim 12 wherein said input gear and said follower gear are disposed in said lower portion of said body.

15. The apparatus of claim 9, wherein said first geared surface on said input gear has a pitch diameter greater than said second geared surface.

16. The apparatus of claim 9, wherein said first geared surface has more gear teeth than said second outer geared surface.

17. The apparatus of claim 9, wherein a pitch diameter of said follower gear is greater than a pitch diameter of said second geared surface.

18. The apparatus of claim 9, wherein said follower gear rotates at a slower rate of speed in the same direction as said input shaft in response to rotation of said input shaft.

19. The apparatus of claim 9, wherein said follower gear rotates in a direction opposite the direction of rotation or said input shaft in response to rotation of said input shaft.

20. The apparatus of claim 9, wherein said speed reducer section and said output shaft have a flow passage defined therethrough to communicate fluid to said downhole tool therethrough.

21. The apparatus of claim 9, wherein said inner geared surface is defined by an inner surface of said body.

22. The apparatus of claim 9, further comprising a stationary drive gear fixedly disposed in said body, said inner geared surface being defined by said stationary drive gear.

23. A rotating apparatus for use in a wellbore comprising:

a drive motor having a rotor disposed therein, said rotor being rotatable in response to flow of a fluid through said motor;

a body connected to said drive motor, said body having a geared inner surface therein;

an input shaft connected to said rotor, said input shaft having a first diameter and a second diameter, said second diameter being eccentric from said first diameter;

a solid input gear defining a bore therethrough and having first and second outer geared surfaces thereon, said input gear being disposed in said body so that said first geared outer surface is in geared engagement with said geared inner surface;

a follower gear rotatably disposed in said body concentric with said first diameter of said input shaft, said second geared outer surface being in geared engagement with said follower gear, said second diameter engaging said input gear bore so that as is said input shaft rotates said input gear rotates eccentrically in said inner geared surface and said follower gear, and said follower gear rotates concentrically with said first diameter of said input shaft;

an output shaft rotatable with said follower gear; and a jetting head connected to said output shaft, wherein said fluid is communicated to said jetting head through a longitudinal passage defined by said input shaft and said output shaft, said jetting head defining a jetting port through which said fluid is jetted.

24. The apparatus of claim 23, wherein said second geared outer surface has a smaller pitch diameter than said first outer geared surface.

25. The tool of claim 24, wherein as said input shaft rotates in a first direction, said input gear rotates in an opposite direction and said follower gear rotates in said first direction at a slower rate of speed than said input shaft.

26. The tool of claim 24, wherein as said input shaft rotates in a first direction, said output shaft rotates in an opposite direction.

27. The apparatus of claim 23, wherein said body has an upper portion and a lower portion, said input shaft defining an inlet for communicating said fluid from said motor to said longitudinal passage, said inlet being positioned in said upper portion of said body, said lower portion of said body being filled with a lubricating fluid, the apparatus further comprising a seal disposed about said input shaft below said inlet to sealingly engage said body and said input shaft so that fluids in said upper and lower portions are segregated.

28. The apparatus of claim 23, wherein said output shaft extends through a lower end of said body and sealingly engages said body to prevent fluid or other debris in said wellbore from entering said body through the lower end thereof.

* * * * *